United States Patent
Chauhan et al.

(10) Patent No.: US 10,732,940 B2
(45) Date of Patent: Aug. 4, 2020

(54) ENTERPRISE SERVICES FRAMEWORK FOR PRESENTATION LAYER MANAGEMENT

(71) Applicant: EMC IP Holding Company LLC, Hopkinton, MA (US)

(72) Inventors: Vivek Chauhan, Haryana (IN); Gnanasambandam Palaniswami, Shrewsbury, MA (US); Ankita Rathi, Bhilwara (IN); Hung Dinh, Austin, TX (US); Saged Rizk, West Hartford, CT (US); Israa Adly, Nasr (EG)

(73) Assignee: EMC IP Holding Company LLC, Hopkinton, MA (US)

( * ) Notice: Subject to any disclaimer, the term of this patent is extended or adjusted under 35 U.S.C. 154(b) by 0 days.

(21) Appl. No.: 15/964,777

(22) Filed: Apr. 27, 2018

(65) Prior Publication Data

US 2019/0332360 A1    Oct. 31, 2019

(51) Int. Cl.
*G06F 8/36*    (2018.01)
*G06F 8/71*    (2018.01)
(Continued)

(52) U.S. Cl.
CPC .......... *G06F 8/36* (2013.01); *G06F 8/38* (2013.01); *G06F 8/71* (2013.01); *G06F 11/3688* (2013.01)

(58) Field of Classification Search
CPC ..... G06F 8/20; G06F 8/30; G06F 8/33; G06F 8/34; G06F 8/35; G06F 8/36; G06F 8/38; G06F 8/71; G06F 11/3688
(Continued)

(56) References Cited

U.S. PATENT DOCUMENTS 5,689,711 A   11/1997  Bardasz
6,359,637 B1   3/2002  Perkins
(Continued)

OTHER PUBLICATIONS

O. R. Bagheri, R. Nasiri, M. H. Peyravi and P. K. Dehkordi, "Toward an elastic service based framework for Enterprise Application Integration," 5th ACIS International Conference on Software Engineering Research, Management & Applications (SERA 2007), Busan, 2007, pp. 711-719. (Year: 2007).*

(Continued)

*Primary Examiner* — Andrew M. Lyons
(74) *Attorney, Agent, or Firm* — Ryan, Mason & Lewis, LLP

(57) ABSTRACT

Methods, apparatus, and processor-readable storage media related to an enterprise services framework for presentation layer management are provided herein. An example computer-implemented method includes representing user interface components related to an application in a pre-determined format, wherein the pre-determined format uses text to represent data objects; creating a first version of the application by embedding, in response to one or more user inputs, one or more of the user interface components into a design space of a presentation layer of an enterprise services framework; updating, in accordance with the embedding of the one or more user interface components into the design space, a schema associated with the multiple user interface components represented in the pre-determined format; and dynamically outputting one or more subsequent versions of the application based at least in part on the updated schema.

20 Claims, 17 Drawing Sheets

(51) Int. Cl.
*G06F 8/38* (2018.01)
*G06F 11/36* (2006.01)

(58) Field of Classification Search
USPC ......... 717/104–107, 109–110, 113, 120–123
See application file for complete search history.

(56) References Cited

U.S. PATENT DOCUMENTS

| | | | |
|---|---|---|---|
| 6,704,454 | B1 | 3/2004 | Spence |
| 6,922,807 | B1 | 7/2005 | Miyata |
| 7,065,717 | B1 | 6/2006 | Perkins |
| 7,281,018 | B1 | 10/2007 | Begun |
| 7,509,244 | B1 | 3/2009 | Shakeri |
| 7,693,848 | B2 | 4/2010 | Dejean |
| 7,716,179 | B1 | 5/2010 | Agapiev et al. |
| 8,122,050 | B2 | 2/2012 | Mordvinov |
| 8,307,109 | B2* | 11/2012 | Mamou ................. G06F 16/254 709/232 |
| 8,478,616 | B2* | 7/2013 | De Klerk ............... G06Q 10/10 705/7.11 |
| 8,706,667 | B2 | 4/2014 | Stanfill et al. |
| 8,719,066 | B2 | 5/2014 | Cartwright |
| 8,856,724 | B2* | 10/2014 | Somani ..................... G06F 8/30 717/101 |
| 8,863,069 | B1 | 10/2014 | Venkataramani |
| 9,329,838 | B2* | 5/2016 | Tattrie ..................... G06F 9/451 |
| 9,619,445 | B1 | 4/2017 | Neuberg et al. |
| 10,019,239 | B2* | 7/2018 | Tattrie ....................... G06F 8/20 |
| 10,305,758 | B1 | 5/2019 | Bhide et al. |
| 10,318,285 | B1* | 6/2019 | Jodoin ...................... G06F 8/40 |
| 2002/0059334 | A1 | 5/2002 | Jelbert |
| 2002/0099732 | A1 | 7/2002 | Miller |
| 2002/0156814 | A1 | 10/2002 | Ho |
| 2003/0067481 | A1 | 4/2003 | Chedgey |
| 2003/0176999 | A1 | 9/2003 | Calcagno et al. |
| 2006/0155700 | A1 | 7/2006 | Dejean |
| 2006/0277231 | A1* | 12/2006 | Kral .......................... G06F 8/70 708/102 |
| 2007/0079282 | A1* | 4/2007 | Nachnani ................. G06F 8/34 717/106 |
| 2007/0245231 | A1 | 10/2007 | Kibler |
| 2007/0266368 | A1 | 11/2007 | Szpak |
| 2009/0217248 | A1 | 8/2009 | Bently et al. |
| 2009/0240483 | A1* | 9/2009 | Adams .................. G06F 11/261 703/15 |
| 2010/0058164 | A1 | 3/2010 | Best |
| 2010/0079462 | A1 | 4/2010 | Breeds |
| 2010/0211754 | A1 | 8/2010 | Crosby |
| 2011/0066934 | A1 | 3/2011 | Treisman |
| 2011/0289425 | A1 | 11/2011 | Pletter |
| 2012/0066586 | A1 | 3/2012 | Shemesh |
| 2013/0152078 | A1* | 6/2013 | Arcilla ...................... G06F 8/60 718/1 |
| 2013/0332241 | A1 | 12/2013 | Taylor |
| 2014/0006991 | A1 | 1/2014 | Kalaidjian |
| 2014/0032480 | A1 | 1/2014 | Lesage |
| 2014/0123061 | A1 | 5/2014 | Bennett |
| 2014/0143763 | A1* | 5/2014 | Bhargava .................. G06F 8/20 717/139 |
| 2014/0279976 | A1* | 9/2014 | Davidson .............. G06F 16/219 707/695 |
| 2014/0317045 | A1* | 10/2014 | Quine .................... G06F 16/212 707/601 |
| 2015/0142726 | A1 | 5/2015 | Taylor |
| 2016/0092525 | A1* | 3/2016 | Kothari ................. G06F 16/219 707/602 |
| 2016/0291942 | A1 | 10/2016 | Hutchison |
| 2016/0321234 | A1 | 11/2016 | Basta |
| 2017/0097927 | A1 | 4/2017 | Levi et al. |
| 2017/0115968 | A1* | 4/2017 | Fukala ...................... G06F 8/38 |
| 2017/0124617 | A1* | 5/2017 | Spoelstra ........... G06Q 30/0621 |
| 2017/0270037 | A1* | 9/2017 | Barjaktarovic ..... G06F 11/3688 |
| 2018/0081645 | A1* | 3/2018 | Alurralde Iturri ........ G06F 8/35 |
| 2018/0232456 | A1* | 8/2018 | Sherman ............. G06F 9/45529 |
| 2018/0232648 | A1 | 8/2018 | Acharya |
| 2018/0247243 | A1* | 8/2018 | Moolman ............... G06F 17/50 |
| 2018/0253296 | A1* | 9/2018 | Brebner ..................... G06F 8/20 |
| 2018/0321831 | A1* | 11/2018 | Klemenz ................. G06F 9/451 |
| 2019/0236226 | A1 | 8/2019 | Kuwahara |
| 2019/0361686 | A1 | 11/2019 | Gnazdowsky |

OTHER PUBLICATIONS

G. Berio, A. Di Leva, P. Giolito and F. Vernadat, "The M*-Object methodology for information system design in CIM environments," in IEEE Transactions on Systems, Man, and Cybernetics, vol. 25, No. 1, pp. 68-85, Jan. 1995. (Year: 1995).*
G. Vella, N. Ingraffia, M. Liotta, A. Santangelo and A. Gentile, "XPL, a Presentation Language based on User Interface Design Pattern," 6th IEEE/ACIS International Conference on Computer and Information Science (ICIS 2007), Melbourne, Qld., 2007, pp. 285-290. (Year: 2007).*
Wikipedia, Google Forms, Oct. 28, 2018.
Wikipedia, Salesforce.com, Oct. 30, 2018.
Wikipedia, Formstack, Jul. 11, 2018.
Wikipedia, Typeform, Sep. 19, 2018.
Wikipedia, FormAssembly, May 9, 2018.
Wikipedia, Adobe Marketing Cloud, Oct. 23, 2018.
Wikipedia, Word Press, Oct. 30, 2018.
Wikipedia, Joomla, Oct. 30, 2018.
AnswerModules, https://web.archive.org/web/20180823180310/http://www.answermodules.com/, Aug. 23, 2018.
Wufoo, www.wufoo.com, Apr. 26, 2018.
Wikipedia, JotForm, https://en.wikipedia.org/w/index.php?title=JotForm&oldid=787479133, Jun. 25, 2017.
Wikipedia, Formsite, https://en.wikipedia.org/w/index.php?title=Formsite&oldid=827087783, Feb. 22, 2018.
Ron Cytron et al. ACM Transactions on Programming Languages and Systems, Efficiently Computing Static Single Assignment Form and the Control Dependence Graph, vol. 13, No. 4. Oct. 1991, pp. 451-490.

* cited by examiner

FIG. 4

402 — Text Input

ADD  RULES

Label

[Text Input]

Description

[ ]

○ Red  ○ Green  ○ None

Tooltip

[ ]

☐ Required

SAVE  CANCEL  DELETE

404 — Text Input

ADD  RULES

Hide/Show Rules
Show when:

[None ▼]

```
[ {
    "id":"Aa-id-attribute-13485714252894",
    "component":"textInput",
    "editable":true,
    "index":0,
    "label":"Text Input",
    "container":[ ],
    "multiSelect":[ ],
    "columns":[ ],
    "description":"",
    "tooltip":"",
    "placeholder":"",
    "options":[ ],
    "required":false,
    "labelRequired":false,
    "validation":"/.*/",
    "ColumnsList":[ ],
    "personalDetails":[ ],
    "rows":[ ],
    "labelList":[ ],
    "optionsList":[ ],
    "dependent":[ ],
    "operator":[ ],
    "selectedDependent":[ ]
} ]
```

```
[ {
    "id":"Aa-id-attribute-13485714252894",
    "label":"Text Input",
    "component":"textInput",
    "display":{
      "0":"fb-form-object",
      "1":"ng-scope"
    },
    "value":"22",
    "required":false,
    "columnsList":[ ],
    "labelList":[ ]
} ]
```
600

FIG. 7

```
spring.data.mongodb.repositories.enabled=true
spring.data.mongodb.uri=mongodb://localhost:18475/srtproduct jdbc.driver=org.postgresql.Driver
jdbc.url=jdbc:postgresql://localhost:2708/srft
jdbc.username=*****
jdbc.password=*****
database.dialect=org.hibernate.dialect.PostgreSQLDialect
database=POSTGRESQL
```
700

FIG. 9

```
              <<Java Class>>
            ©ProductDesignerController                — 902
            com.emc.srt.product.controller
─────────────────────────────────────────────────
S,F  logger: Logger
  ○  CLASSNAME: String
S,F  appHost: String
S,F  revision: String
  ○  ftlConfiguration: FtlConfiguration
─────────────────────────────────────────────────
  ♂ ProductDesignerController()
  ○  init():void
  ○  saveLocalJSON(String,String,String,String,String,String):ProductLocal
  ○  saveProductJSON(String,String,String,String,String,String,String):Product
  ○  saveProductMappingSRT()(String,String):boolean
  ○  getProductMappingSRT():List<ProductMappingSRT>
  ○  getProductJson(String,String):Product
  ○  getLatestPublishedProduct(String,String):Boolean
  ○  getProductLocal(String,String,String):ProductLocal
  ○  getAllProductNames(String):List<ProductName>
  ○  getAllProducts():List<Product>
  ○  getProductInSRT(String,String,Boolean):Product
  ○  getAllProductsInSRTByRequestId(Spring):List<Product>
  ○  getAllProductsInSRTByRequestIdFTL(String):List<TemplateProduct>
  ○  getProductInSRTReviewTabByRequestId(String):List<Product>
  ○  convertEscapedTableArray(String,String):String
  □  getTest():String
  ○  removeProduct(String):void
  ○  renameProductServer(String,String,String):boolean
  ○  unLockProduct(String,String):Boolean
─────────────────────────────────────────────────
              TO FIG. 9 cont-1
```

FIG. 10

```
$builderProvider.registerComponent('container', {
  group: 'Default',
  label: 'Container',
  description: '',
  placeholder: '',
  required: false,
  dependent: [],
  container :[],
  selectedDependent: [],
  operator :[],
  template: "<div style=\"border-bottom: 1px solid #6fc4ff;color: #568ec3;font-weight: bold;line-height: 18px;padding-top: 10px;text-transform: uppercase;\">\n <label id=\"{{formObject.id}}\" for=\"{{formName+index}}\" class=\"control-label\"><strong>{{label}}</strong></label>\n <div class=\"row\"></div>\n <div class=\"clearfix\"></div>\n </div>",
  popoverTemplate: "<form>\n <md-tabs md-dynamic-height md-border-bottom><md-tab label=\"Add\"><md-content class=\"md-padding\"> <div class=\"form-group\">\n <label class=\"control-label\">Label</label>\n <input type=\"text\" ng-model=\"label\" ng-model-options=\"{ updateOn: 'blur' }\" validator=\"[required]\" class=\"form-control\"/>\n </md-content></md-tab><md-tab label=\"Rules\"><md-content class=\"md-padding\"><div class=\"form-group\"> <label class='control-label'>Hide/Show Rules</label>\n <div ng-repeat=\"d in dependent track by $index\"><md-list ng-if=\"$index!=0\"><md-list-item>OR  <md-switch ng-model=\"operator[$index]\" aria-label=\"Switch 1\"></md-switch>  AND</md-list-item></md-list><div><label class='control-label'>Show when:</label>\n </div> <div ><select ng-model='dependent[$index]' class=\"form-control\" ng-options=\"value.label for value in $parent.$parent.formObjects | isContainer:true \"></option value=\"\">None</option></select> <div ng-show=\"dependent[$index].options.length > 0\" class=\"form-group\"><div><label class='control-label'>Value is:</label>\n </div> <select ng-options=\"value for value in dependent[$index].options\" class=\"form-control\"\n ng-model=\"selectedDependent[$index]\" />\n </div></div></div> </div>\n <div style=\"text-align : right;\"><a id=\"js-array-storage-row-add\" href=\"javascript:;\" style=\"padding-right : 15px;\"><img src=\"resources/static/ctrl/icon-add.png\" alt=\"\" data-ng-click=\"popover.addRule()\"></a><a><img src=\"resources/static/ctrl/icon-rmv.png\" alt=\"\" data-ng-click=\"popover.removeRule()\"></a></div></n </md-content></md-tab></md-tabs><hr/>\n <div class=\"form-group\">\n <input type=\"button\" ng-click=\"popover.remove($event)\" class=\"btn btn-danger\" value=\"Delete\"/>\n <input type=\"submit\" ng-click=\"popover.save($event)\" class=\"btn btn-default\" value=\"Cancel\"/>\n <input type=\"button\" value=\"Save\"/>\n </div>\n</form>"
});
```

FIG. 11
1100

```
$scope.$watch('[label, description,tooltip, placeholder, required,operator,labelRequired, options,
validation,dependent,selectedDependent,personalDetails,ColumnsList,rows,container,multiSelect]', function() {
    formObject.multiSelect = $scope.multiSelect;
    if($scope.component == "seperator") $scope.label = '';
    formObject.label = $scope.label;
    formObject.personalDetails = $scope.personalDetails;
    formObject.ColumnsList = $scope.ColumnsList;
    formObject.description = $scope.description;
    formObject.tooltip = $scope.tooltip;
    formObject.placeholder = $scope.placeholder;
    formObject.required = $scope.required;
    formObject.labelRequired = $scope.labelRequired;
    formObject.options = $scope.options;
    if(!$scope.dependent) $scope.dependent=[];
    formObject.dependent = $scope.dependent;
    if(!$scope.operator) $scope.operator =[];
            formObject.operator = $scope.operator;
    formObject.rows = $scope.rows;
    formObject.columns = $scope.columns;
    if(!$scope.selectedDependent) $scope.selectedDependent=[];
    formObject.selectedDependent = $scope.selectedDependent;
    return formObject.validation = $scope.validation;
}, true);
```

FIG. 13

1302 — <<Java Class>> Ⓒ ProductNameServer com.emc.srt.model.server

S,F serialVersionUID: long
○ id: String
○ revision: BigInteger
○ productCategory: String ♂ ProductNameServer()
○ getId():String
○ setId(String):void
○ getRevision():BigInteger
○ setRevision(BigInteger):void
○ getProductCategory():String
○ setProductCategory(String):void 1304 — <<Java Class>> Ⓒ ProductClientController com.emc.srt.controller S,F appHost: String
S,F logger: Logger
S,F CLASSNAME: String ♂ ProductClientController()
○ saveAllProductsJSON(String,String):String
○ saveProductJSON(String,String,String,String):boolean
○ copyProductByRequestId(long,long):boolean
○ saveProductNameListToCopyRequest(List<ProductNameBean>,long):boolean
○ getProductClientJSON(String,String):ProductBean
○ getProductClientJsonByRequestId(String):List<ProductBean>
○ getServiceRequestScopeByRequestId(Long):Map<String,List<ProductNameBean>>
○ getProductNameListByRequestId(Long):List<ProductNameBean>
○ getAllProductListFromServer():List<?>
○ saveProductNameClientList(String,Long):boolean
○ getProductNameClientList(Long):List<?>
○ renameProductClient(String,String):void
○ getAttachmentListByRequestId(String):List<String>

1306 — <<Java Interface>> Ⓘ ProductRepository com.emc.srt.repo

○ findById(ProductBaseBean):ProductBean
○ findByRequestId(Long):List<ProductBean>
○ findByProductName(String):List<ProductBean>

1308 — <<Java Interface>> Ⓘ ProductNameRepository com.emc.srt.repo

○ findById(Long):ProductName

-productNameRepository 0..1

-repository 0..1

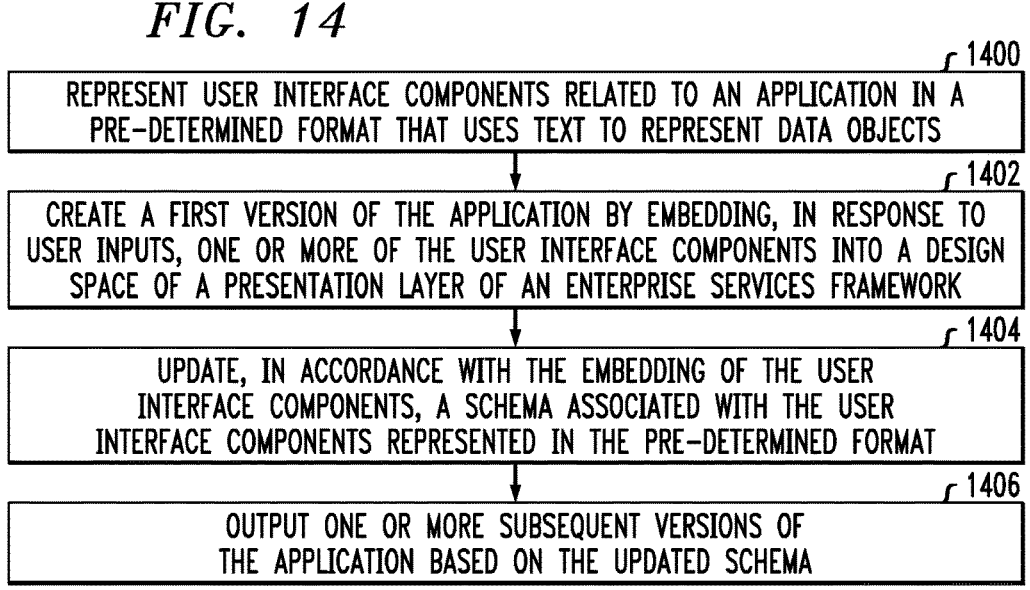
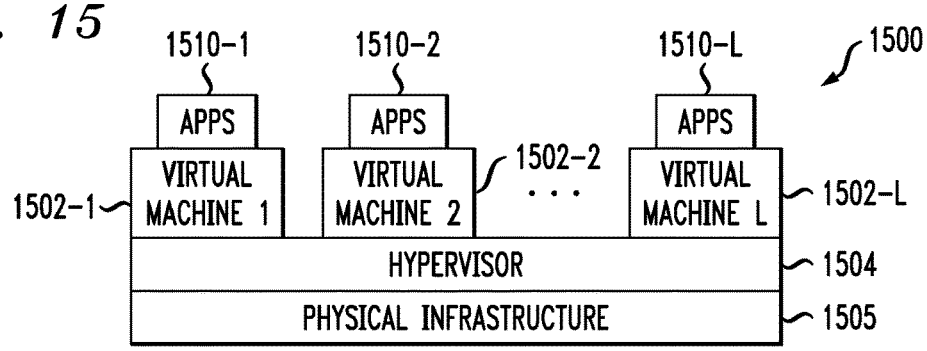
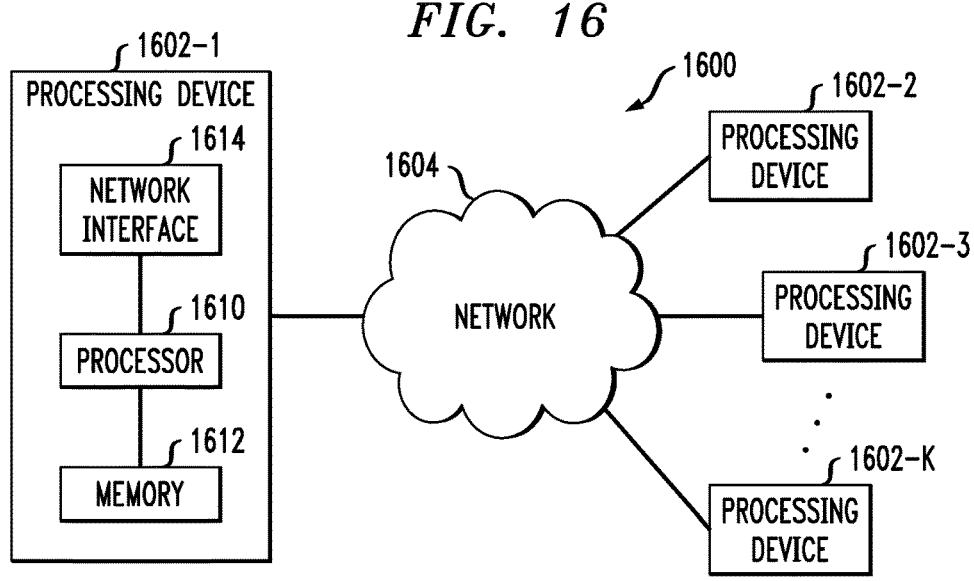

ENTERPRISE SERVICES FRAMEWORK FOR PRESENTATION LAYER MANAGEMENT

FIELD

The field relates generally to information processing systems, and more particularly to techniques for application modification and creation.

BACKGROUND

Conventional application development methods often involve changing a presentation layer by updating a relational database schema and a service layer via non-elastic schema design, which is unduly time-consuming. For example, using conventional methods to update a product user interface design can take approximately 30-60 days because changes need to go through full system development life cycles at multiple application layers. Such methods, accordingly, meaningfully limit efficiency and other enterprise and/or business objectives.

SUMMARY

Illustrative embodiments of the invention provide an enterprise services framework for presentation layer management. An example computer-implemented method includes representing multiple user interface components related to an application in a pre-determined format, wherein the pre-determined format uses text to represent data objects, and creating a first version of the application by embedding, in response to one or more user inputs, one or more of the multiple user interface components into a design space of a presentation layer of an enterprise services framework. Such a method also includes updating, in accordance with the embedding of the one or more user interface components into the design space, a schema associated with the multiple user interface components represented in the pre-determined format, and dynamically outputting one or more subsequent versions of the application based at least in part on the updated schema.

Illustrative embodiments can provide significant advantages relative to conventional application development methods. For example, challenges associated with the time-intensive nature of such methods are overcome through the use of an engine to translate JavaScript object notation (JSON) schema into a presentation layer preserving business logics and validations.

These and other illustrative embodiments described herein include, without limitation, methods, apparatus, systems, and computer program products comprising processor-readable storage media.

BRIEF DESCRIPTION OF THE DRAWINGS

FIG. 4 shows user interface (UI) controls for update attributes of a component with rule-based logic in an illustrative embodiment of the invention.

FIG. 5 shows example properties stored in a JSON schema in an illustrative embodiment of the invention.

FIG. 6 shows example JSON values in an illustrative embodiment of the invention.

FIG. 7 shows pseudocode for configuring and connecting with any NoSQL database and any relational database management system (RDBMS) in an illustrative embodiment of the invention.

FIG. 10 shows example pseudocode for a container component in an illustrative embodiment of the invention.

FIG. 11 shows example pseudocode for updating a component schema in an illustrative embodiment of the invention.

FIG. 13 shows example controller and repository class diagrams for consumption of form data in an illustrative embodiment of the invention.

FIG. 14 is a flow diagram of a process for application development via presentation layer management in an illustrative embodiment.

FIGS. 15 and 16 show examples of processing platforms that may be utilized to implement at least a portion of an information processing system in illustrative embodiments.

DETAILED DESCRIPTION

Illustrative embodiments of the present invention will be described herein with reference to exemplary computer networks and associated computers, servers, network devices or other types of processing devices. It is to be appreciated, however, that the invention is not restricted to use with the particular illustrative network and device configurations shown. Accordingly, the term "computer network" as used herein is intended to be broadly construed, so as to encompass, for example, any system comprising multiple networked processing devices.

Figure 1:
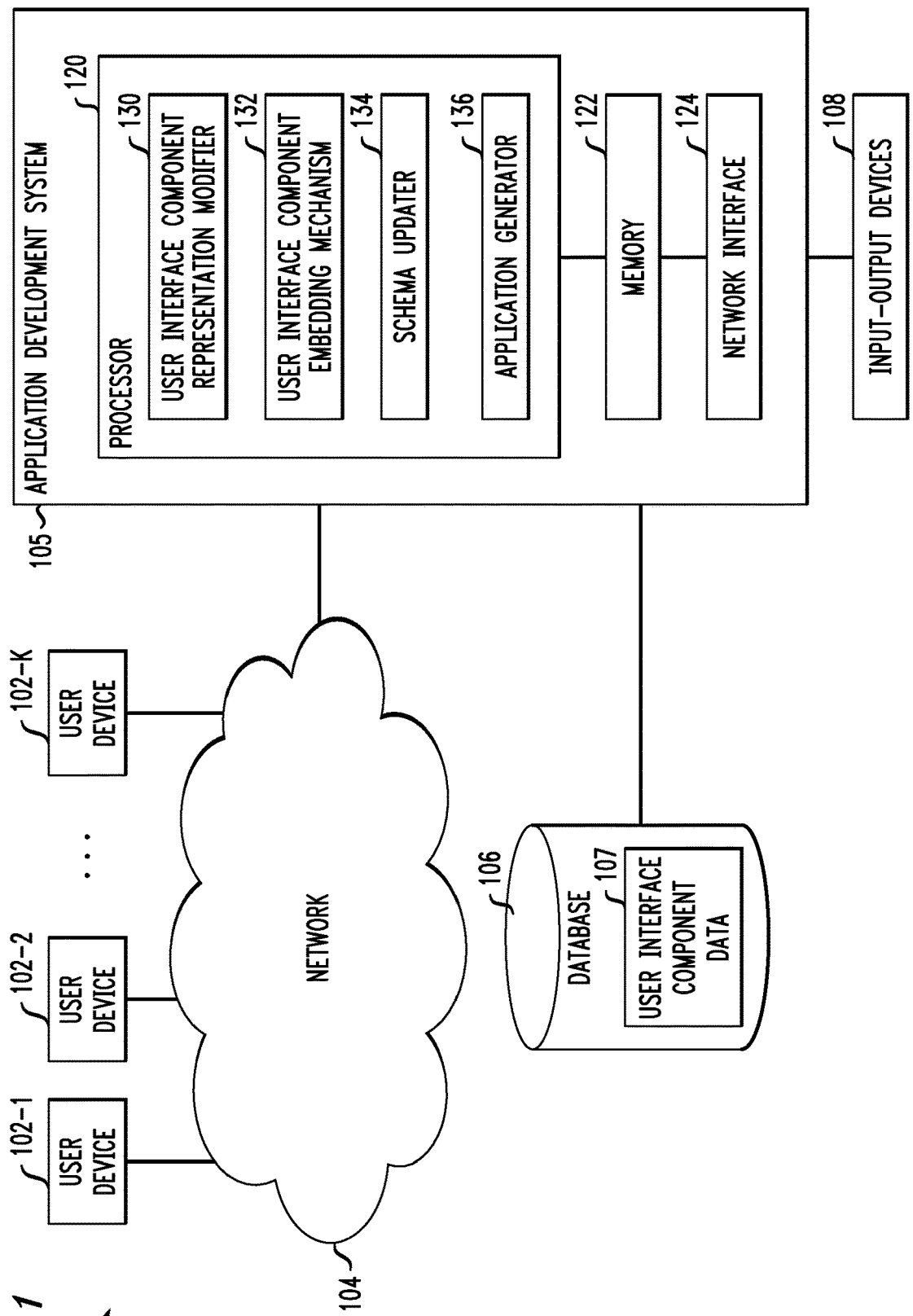
FIG. 1 shows an information processing system configured for application development via presentation layer management in an illustrative embodiment of the invention.

FIG. 1 shows a computer network (also referred to herein as an information processing system) 100 configured in accordance with an illustrative embodiment of the invention. The computer network 100 includes a plurality of user devices 102-1, 102-2, . . . 102-K, collectively referred to herein as user devices 102. The user devices 102 are coupled to a network 104, where the network 104 in this embodiment is assumed to represent a sub-network or other related portion of computer network 100. Accordingly, elements 100 and 104 are both referred to herein as examples of "networks" but the latter is assumed to be a component of the former in the context of the FIG. 1 embodiment. Also coupled to network 104 is application development system 105.

The user devices 102 may comprise, for example, mobile telephones, laptop computers, tablet computers, desktop computers or other types of computing devices. Such devices are examples of what are more generally referred to herein as "processing devices." Some of these processing devices are also generally referred to herein as "computers."

The user devices 102 in some embodiments comprise respective computers associated with a particular company, organization or other enterprise. In addition, at least portions of the computer network 100 may also be referred to herein as collectively comprising an "enterprise network." Numerous other operating scenarios involving a wide variety of different types and arrangements of processing devices and networks are possible, as will be appreciated by those skilled in the art.

Also, it is to be appreciated that the term "user" in this context and elsewhere herein is intended to be broadly construed so as to encompass, for example, human, hardware, software or firmware entities, as well as various combinations of such entities.

The network 104 is assumed to comprise a portion of a global computer network such as the Internet, although other types of networks can be part of the computer network 100, including a wide area network (WAN), a local area network (LAN), a satellite network, a telephone or cable network, a cellular network, a wireless network such as a Wi-Fi or WiMAX network, or various portions or combinations of these and other types of networks. The computer network 100 in some embodiments therefore comprises combinations of multiple different types of networks, each comprising processing devices configured to communicate using internet protocol (IP) or other related communication protocols.

The application development system 105 has an associated database 106 configured to store data characterizing user interface components for a plurality of applications and/or versions thereof. The database 106 more particularly stores user interface component data 107 illustratively comprising components, values, relational structured details, etc.

The database 106 in the present embodiment is implemented using one or more storage systems associated with the application development system 105. Such storage systems can comprise any of a variety of different types of storage including network-attached storage (NAS), storage area networks (SANs), direct-attached storage (DAS) and distributed DAS, as well as combinations of these and other storage types, including software-defined storage.

Also associated with the application development system 105 are input-output devices 108, which illustratively comprise keyboards, displays or other types of input-output devices in any combination. Such input-output devices are used to support one or more user interfaces to the application development system 105, as well as to support communication between the application development system 105 and other related systems and devices not explicitly shown.

The application development system 105 in the FIG. 1 embodiment is assumed to be implemented using at least one processing device. Each such processing device generally comprises at least one processor and an associated memory, and implements one or more functional modules for controlling certain features of the application development system 105.

More particularly, the application development system 105 in this embodiment comprises a processor 120 coupled to a memory 122 and a network interface 124.

The processor 120 illustratively comprises a microprocessor, a microcontroller, an application-specific integrated circuit (ASIC), a field-programmable gate array (FPGA) or other type of processing circuitry, as well as portions or combinations of such circuitry elements.

The memory 122 illustratively comprises random access memory (RAM), read-only memory (ROM) or other types of memory, in any combination. The memory 122 and other memories disclosed herein may be viewed as examples of what are more generally referred to as "processor-readable storage media" storing executable computer program code or other types of software programs.

One or more embodiments of the invention include articles of manufacture, such as computer-readable storage media. Examples of an article of manufacture include, without limitation, a storage device such as a storage disk, a storage array or an integrated circuit containing memory, as well as a wide variety of other types of computer program products. The term "article of manufacture" as used herein should be understood to exclude transitory, propagating signals.

The network interface 124 allows the application development system 105 to communicate over the network 104 with the user devices 102, and illustratively comprises one or more conventional transceivers.

The processor 120 further comprises a user interface component representation modifier 130, a user interface component embedding mechanism 132, a schema updater 134 and an application generator 136.

It is to be appreciated that this particular arrangement of modules 130, 132, 134 and 136 illustrated in the processor 120 of the FIG. 1 embodiment is presented by way of example only, and alternative arrangements can be used in other embodiments. For example, the functionality associated with the modules 130, 132, 134 and 136 in other embodiments can be combined into a single module, or separated across a larger number of modules. As another example, multiple distinct processors can be used to implement different ones of the modules 130, 132, 134 and 136 or portions thereof.

At least portions of the user interface component representation modifier 130, user interface component embedding mechanism 132, schema updater 134 and application generator 136 may be implemented at least in part in the form of software that is stored in memory 122 and executed by processor 120.

It is to be understood that the particular set of elements shown in FIG. 1 for providing an enterprise services framework for presentation layer management involving user devices 102 of computer network 100 is presented by way of illustrative example only, and in other embodiments, additional or alternative elements may be used. Thus, another embodiment may include additional or alternative systems, devices and other network entities, as well as different arrangements of modules and other components.

By way of example, in other embodiments, the application development system 105 can be eliminated and associated elements such as user interface component representation modifier 130, user interface component embedding mechanism 132, schema updater 134 and application generator 136 can be implemented elsewhere in the computer network 100.

An exemplary process utilizing user interface component representation modifier 130, user interface component embedding mechanism 132, schema updater 134 and application generator 136 of the application development system 105 in computer network 100 will be described in more detail with reference to the flow diagram of FIG. 14.

At least one embodiment of the invention includes providing a real-time solution implemented via data-driven form design and an elastic schema, which can facilitate an improved user experience. Such an embodiment includes generating and implementing an application programming interface (API) which can enable integration with enterprise applications and provide real-time updates to such applications, while preserving existing values entered by users in such applications. Additionally, such an embodiment includes maintaining versioning for content updates, thereby providing flexibility for a user to work on previous versions of the content. Further, as detailed herein, one or more embodiments of the invention can include carrying out such functions as described above and herein with zero wait-time or down-time.

For example, at least one embodiment of the invention includes executing digital transformations using one or more third platform technologies with micro-services using JSON to transfer requests and response data. Such transformations can, for example, enhance delivery of pre-sales solutions from 30-60 days to approximately 120 minutes. In one or more such embodiments, an attachment component can be implemented which integrates with NAS and/or elastic cloud storage, as well as with the underlying enterprise application. Additionally, in at least one embodiment of the invention, logical rules can be applied using a rule-based engine embedded for UI components along with validations using a JSON-based schema design. Also, an engine can be implemented which translates a JSON schema into a presentation layer, while preserving the existing logical behavior of the application. At least one embodiment of the invention can additionally include providing quality control using a test-driven design (TDD) approach for managing the presentation layer. Further, in such an embodiment, designed product forms can be exposed as a service representational state transfer (REST) and integrated with the targeted application. By way merely of illustration, using an example embodiment of the invention, pre-sales content designers would be able to publish real-time updates to production to improve the likelihood of successfully obtaining opportunity and deal information.

Figure 2:
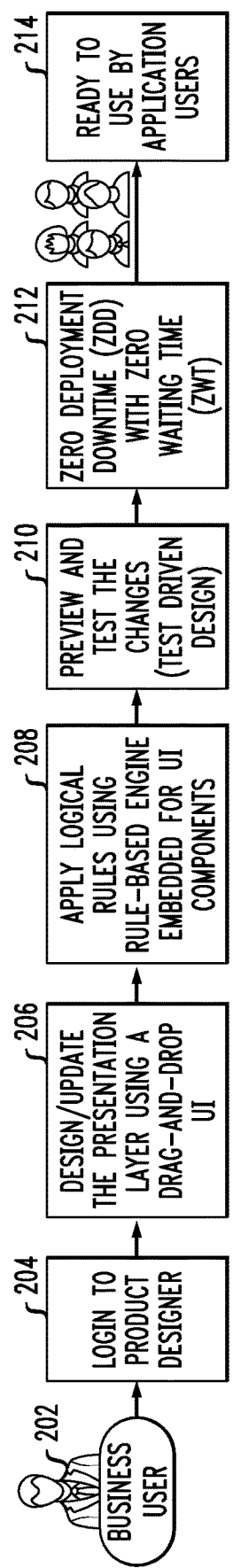
FIG. 2 shows flow diagrams of illustrative embodiments of the invention.

FIG. 2 shows flow diagrams of illustrative embodiments of the invention. By way of illustration, FIG. 2 depicts a business user 202, who logs-in to the product designer in step 204, and therein, can design and/or update the presentation layer (associated with a particular application) in step 206 using a drag-and-drop UI of an example embodiment of the invention. Further in step 208, logical rules can be applied using a rule-based engine embedded for UI components (in connection with the particular application). Additionally, step 210 includes previewing and testing the changes with zero deployment down-time (ZDD) and zero waiting time (ZWT), as noted in element 212, and step 214 includes generating and/or outputting the changed/updated version of the application for use by one or more users.

Figure 3:
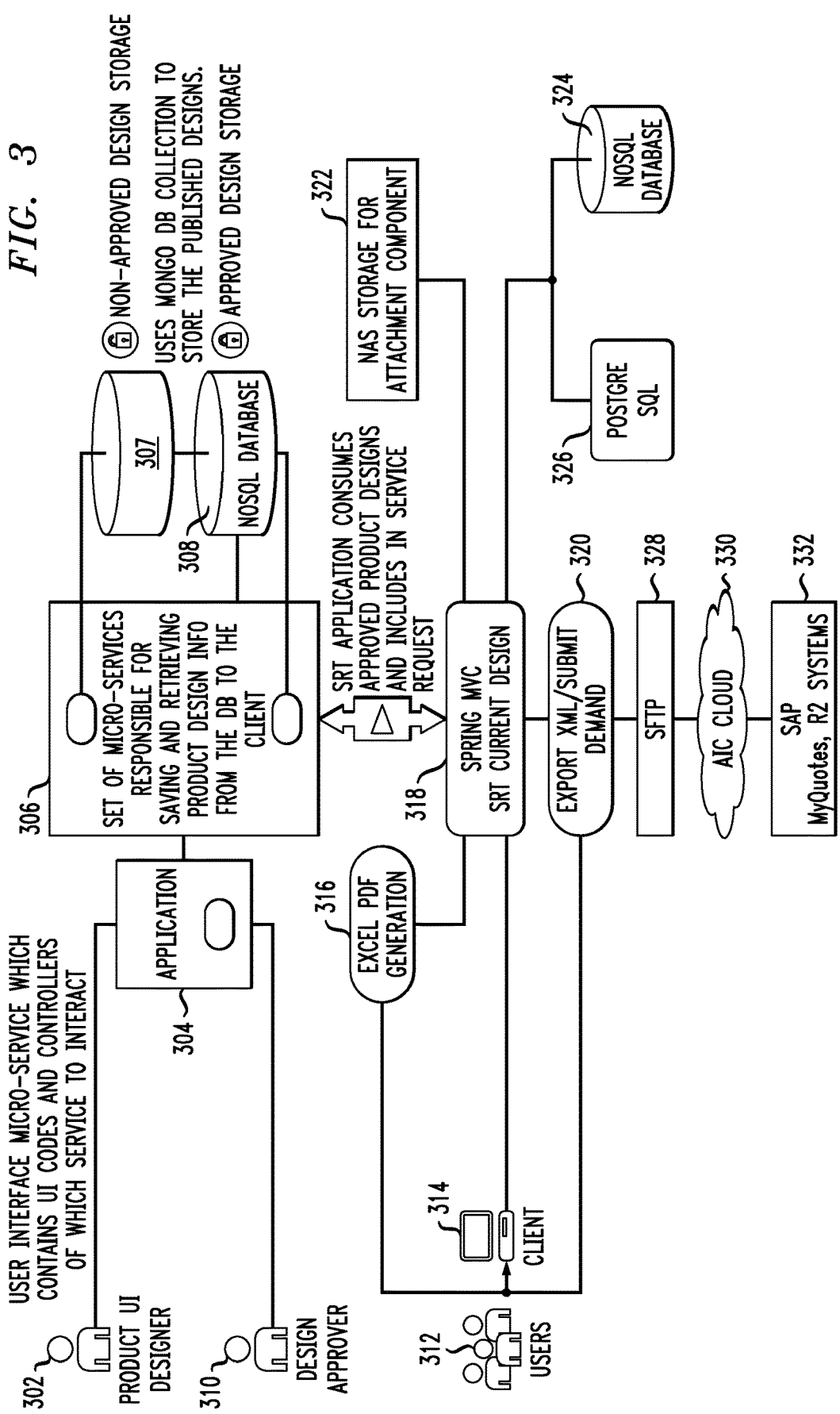
FIG. 3 shows system architecture of an illustrative embodiment of the invention.

FIG. 3 shows system architecture of an illustrative embodiment of the invention. By way of illustration, FIG. 3 depicts a product UI designer 302, a design approver 310 and users 312 (attributed to at least client device 314). As used herein, a design approver 310 can review and publish an updated design to the integrated and/or new application. The product UI designer 302 and the design approver 310 can access a target application 304 via one or more UI micro-services which contain UI codes and controllers for relating the application with one or more services. Additionally, a set of micro-services 306 can be responsible for saving and retrieving product design information from a database (DB) to a client device (such as 314). For example, as depicted in FIG. 3, non-approved UI designs can be stored in NoSQL database 307 while approved designs can be stored in NoSQL database 308.

As also depicted in FIG. 3, end users 312 of the integrated enterprise application can interact, via client system 314, with a generic micro-service 316 to generate portable document format (PDF) documents and/or spreadsheet documents dynamically based on the updated presentation layer (wherein such generated documents can be used, for example, for reporting purposes). Additionally, the client system 314 consumes the changes published via the enterprise services framework (as detailed herein) for presentation layer management, and can include a mobile device, a tablet, a personal computer, etc.

As depicted in FIG. 3, element 318 represents an example of an integrated enterprise application which consumes the JSON-based presentation layer design via a connector from the enterprise services framework micro services 306. Additionally, element 320 represents a generic output of extensible markup language (XML) produced by the framework to be shared by downstream enterprise applications, and element 322 represents NAS for one or more attachments. Further, element 324 represents a NoSQL repository that can integrate with downstream enterprise applications and link any data of the underlying integrated application, and element 326 represents RDBMS storage of the integrated enterprise application. Element 328 represents a secure file transfer protocol for storage and systems integration, which can store the generated application data in an XML format. Additionally, element 330 represents an application integration cloud (AIC) to integrate data from different enterprise application systems, and element 332 represents an enterprise application connection and component for utilizing generated data.

One or more embodiments of the invention are capable of overcoming existing challenges of conventional design approaches which required updating database schema and Java codebases with every update made to a product, which would also generally require changes be made to PDF generation updates. Such an embodiment includes generating and presenting a (increasingly robust) customizable set of components to be used (via a drag-and-drop mechanism) in UI design and NoSQL storage techniques, which enables elastic storage design and which precludes coding to publish dynamic content changes of products. In at least one embodiment of the invention, each UI component is represented as a JSON format, and users can drag-and-drop such components into a droppable area of the designer while also being able to embed text fields, input boxes, tables, radio and one or more other HTML components in the design(s). Such an embodiment additionally includes monitoring each addition and/or modification and updating the JSON schema in real-time in accordance therewith. As detailed herein, users can preview and/or test their design and/or content updates prior to publishing.

Users can change the nature of a component, for example, by modifying one or more attributes of a component. Such attributes can include, for example, a label attribute (related to changing label information of a component), a description attribute (related to having the additional information displayed and/or highlighting specific portions of information (using different colors)), a tooltip attribute (related to displaying information or a hint upon a specified user action (the hovering of a mouse, for example), a required attribute (related to adding validation for a component), and a rules attribute (related to allowing the user to add rules to a component (such as showing or hiding a given component)).

Also, in one or more embodiments of the invention, meta-information pertaining to each component can be stored in the form of JSON, with structure and values being distinguished. By way merely of example, FIG. 4, FIG. 5 and FIG. 6 include depictions of examples for text fields and how JSON inputs can be structured.

FIG. 4 shows UI controls for update attributes of a component with rule-based logic in an illustrative embodiment of the invention. Specifically, UI control 402 depicts a text input prompt for adding a label, a description related thereto, and a tooltip related thereto. Additionally, UI control 404 depicts a text input prompt for setting one or more parameters (such as context and/or conditions for hiding or showing the rule(s)) for one or more particular rules.

FIG. 5 shows example properties 500 stored in a JSON schema in an illustrative embodiment of the invention. In one or more embodiments of the invention, one or more UI controls (such as 402 and 404 in FIG. 4, for example) can be used to modify properties (such as depicted in FIG. 5) stored in a structure JSON schema. Similarly, FIG. 6 shows example JSON values 600 in an illustrative embodiment of the invention.

FIG. 7 shows pseudocode 700 for configuring and connecting with any NoSQL database and any RDBMS in an illustrative embodiment of the invention. In the example pseudocode 700 depicted in FIG. 7, configuration and connection with MongoDB and PostgreSQL is detailed. As further noted herein, MongoDB can be used, for example, to store JSON generated by the product structure and values, and PostgreSQL can be used, for example, to store the relational structured details in the schema for application requests. Additionally, a link can be established between MongoDB data and PostgreSQL data using a request identifier (ID) as the key identifier.

Figure 8:
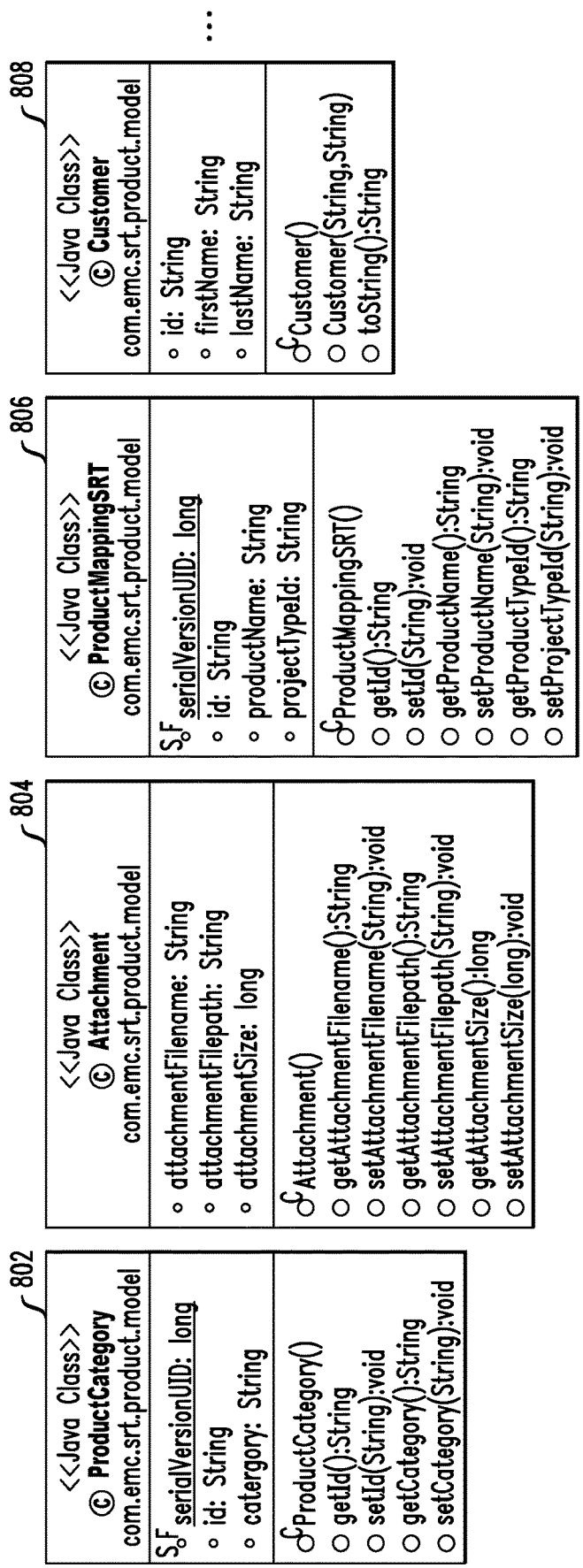
FIG. 8 shows the design of a generic micro-service in an illustrative embodiment of the invention.
Figure 8:
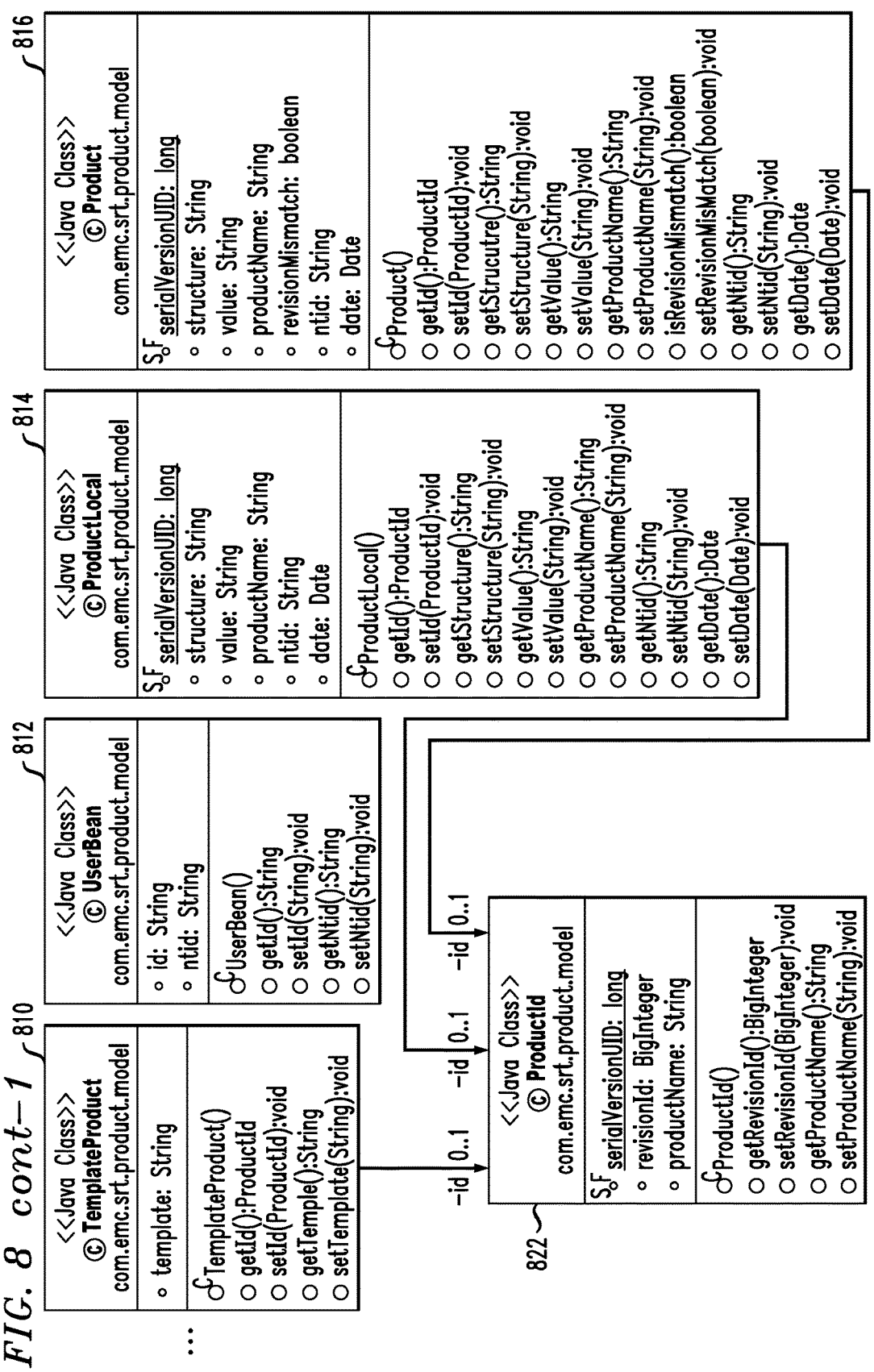
Figure 8:
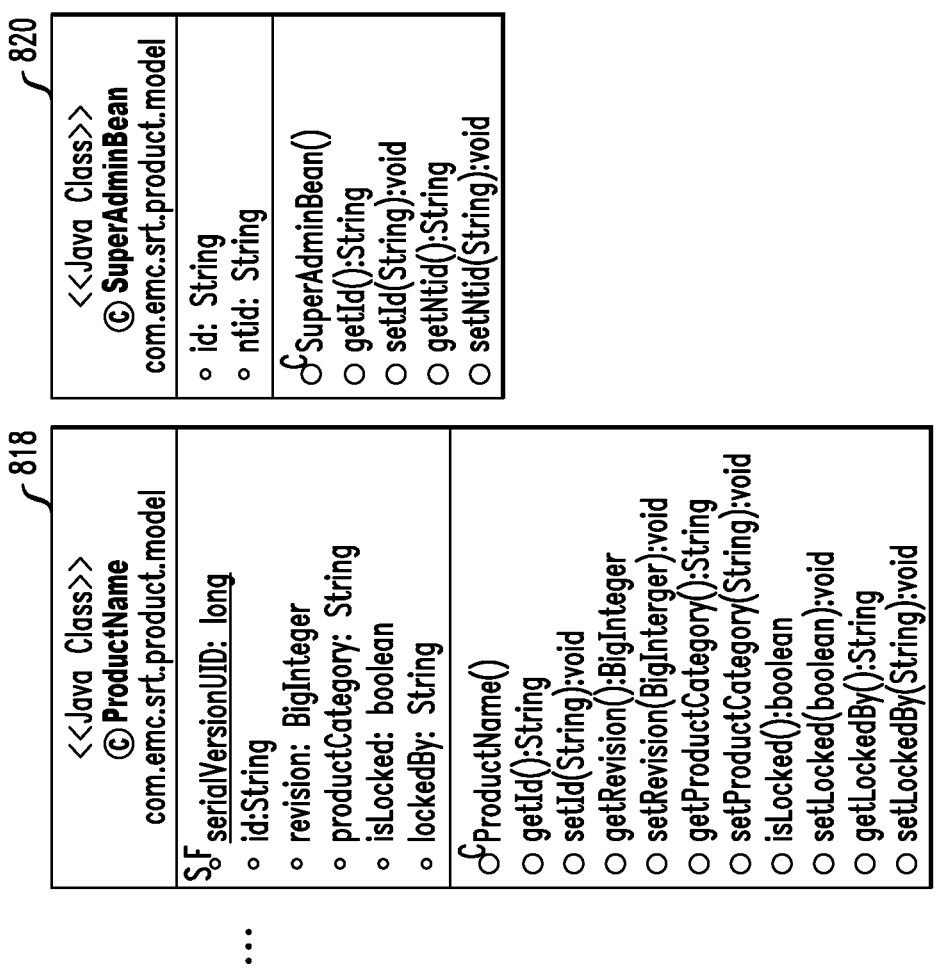

FIG. 8 shows the design of a generic micro-service in an illustrative embodiment of the invention. In the example depicted in FIG. 8, various Java classes can be utilized in a micro-services design architecture. Such Java classes can include, for example, a product category class 802, an attachment class 804, a product mapping class 806, a customer class 808, a product template class 810, a user class 812, a local product class 814, a product class 816, a product name class 818, an administrator class 820, and a product ID class 822.

More specifically, product category class 802 represents a Java class used to distinguish categories of generated content, attachment class 804 represents a Java class used to store attachment-related metadata information, and product mapping class 806 represents a Java class used to map designed presentation content to the integrated enterprise application. Further, customer class 808 represents a Java class used to store customer information, product template class 810 represents a Java class used to generate template information utilized by a free marker templates engine, and user class 812 represents a Java class used to store information pertaining to a logged-in user session to maintain application security and authorization. Also, local product class 814 represents a Java class used to store the non-published presentation layer JSON data comprising its structure and values, and product class 816 represents a Java class used to store the published and approved version of the presentation layer with revision specifications, along with structure and value details of the presentation layer. Further, product name class 818 represents a Java class used to store the name of the designed content, administrator class 820 represents a Java class used to store administrator information and govern workflow, and product ID class 822 represents a super class of Product, ProductLocal and TemplateProduct information for uniquely identifying the stored JSON schema structure ID.

At least one embodiment of the invention includes implementing micro-services designed for supporting an enterprise services framework, such as detailed herein, wherein such micro-services can interface with an application related to the enterprise services framework and also can interface with a target application (that is, an application being created and/or modified via utilization of the enterprise services framework).

Figure 9:
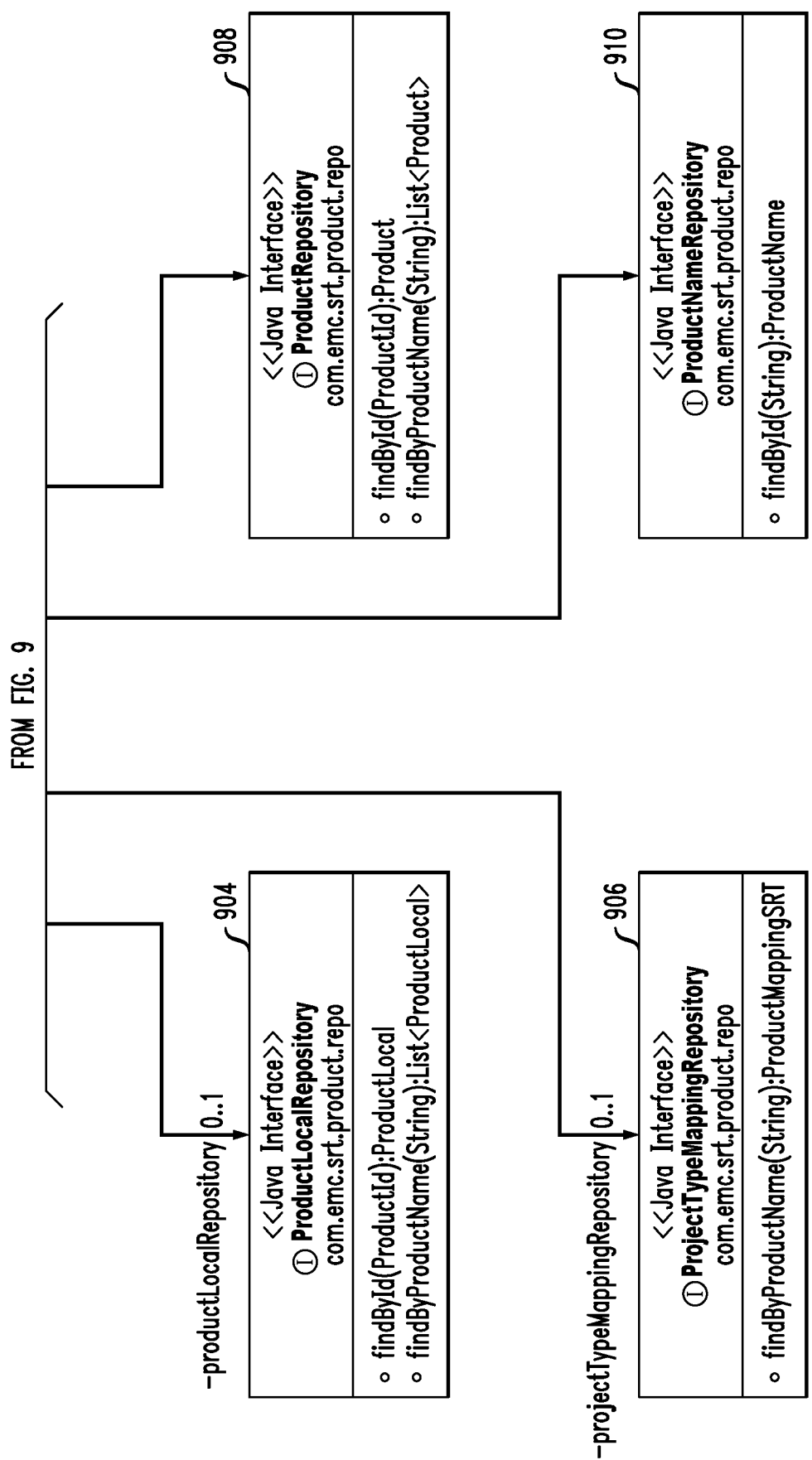
FIG. 9 shows the design of a controller and NoSQL repository micro-service in an illustrative embodiment of the invention.
Figure 9:
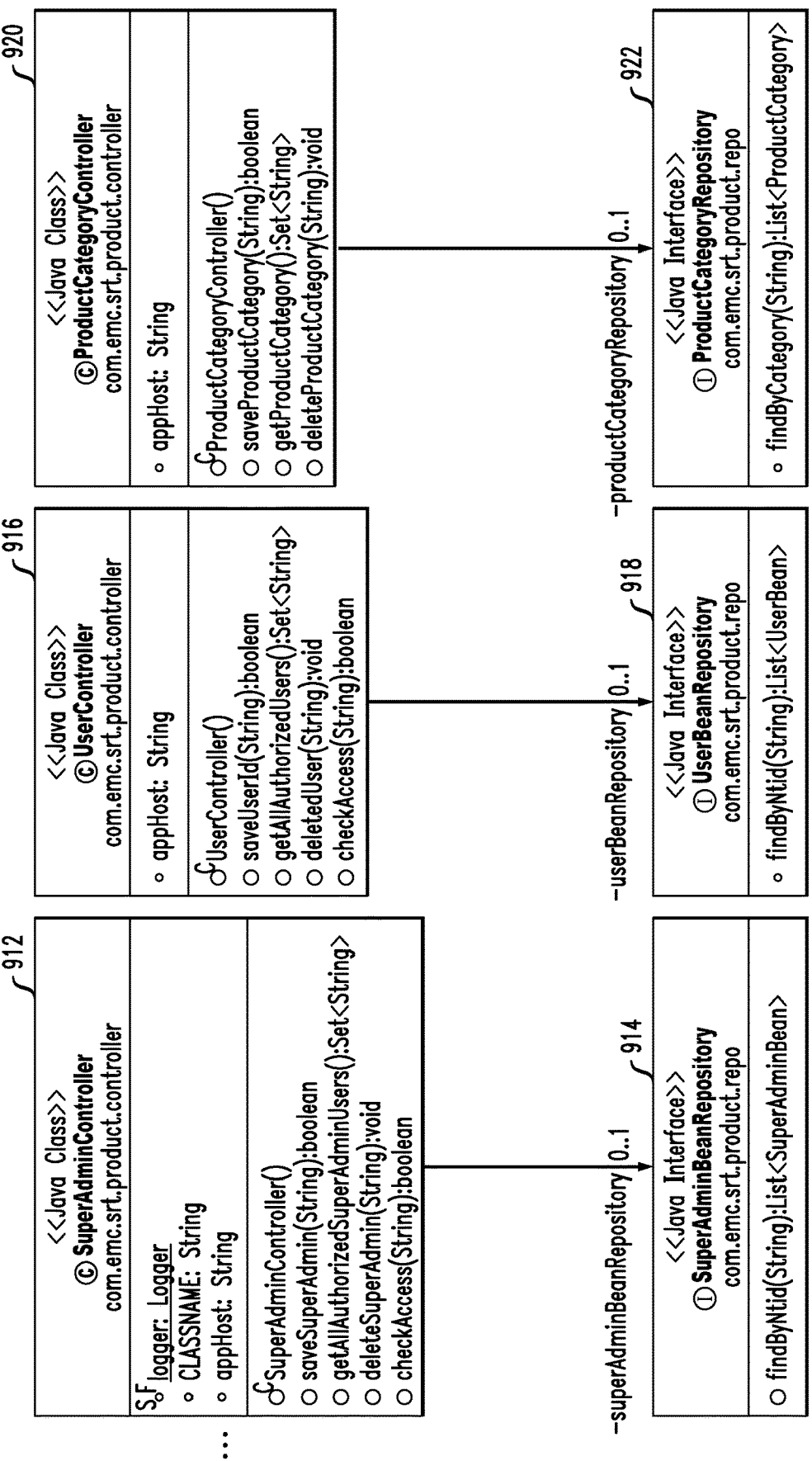

FIG. 9 shows the design of a controller and NoSQL repository micro-service in an illustrative embodiment of the invention. In the example depicted in FIG. 8, various Java classes and Java interfaces can be utilized in the designing of a controller and NoSQL repository micro-service. Such Java classes can include, for example, a product designer controller class 902, an administrator controller class 912, a user controller class 916, and a product category controller class 920. Such Java interfaces can include, for example, a local product repository interface 904, a project type mapping repository interface 906, a product repository interface 908, a product name repository interface 910, an administrator repository interface 914, a user repository interface 918 and a product category repository interface 922.

More specifically, product designer controller class 902 represents a controller class providing implementation classes of a product micro-service written using the Spring boot technology framework and providing generic implementation of end-points and business logics that govern the publishing and designing processes from the enterprise services framework for presentation layer management. Additionally, local product repository interface 904 represents an interface establishing contact for interfacing with an NoSQL database for non-published presentation layer content, and project type mapping repository interface 906 represents an additional interface establishing contact for interfacing with an NoSQL database. Further, product repository interface 908 represents an interface establishing contact for interfacing with an NoSQL database linking designed presentation layer content with its category, and product name repository interface 910 represents an interface establishing contact for interfacing with an NoSQL database to store the names of the designed presentation layer data. Administrator controller class 912 represents a controller class providing authorization, security and role-based access to designers and approvers, administrator repository interface 914 represents an interface establishing contact for interfacing with an NoSQL database to store a super administrator's user data, and user controller class 916 represents a controller class for providing details of a logged-in user and the role thereof. Further, user repository interface 918 represents an interface establishing contact for interfacing with an NoSQL database to store user data associated with the designed presentation layer, product category controller class 920 represents a controller class to store the designed presentation layer category, and product category repository interface 922 represents an interface establishing contact for interfacing with an NoSQL database to store the designed presentation layer category.

FIG. 10 shows example pseudocode 1000 for a container component in an illustrative embodiment of the invention. Accordingly, one or more embodiments of the invention can include designing user interfaces and making available various components, and FIG. 10 depicts an example of a container component. In at least one embodiment of the invention, multiple additional and different components can be utilized and/or implemented. Such additional components can include, for example, text input, text area, select box, check boxes, radio buttons, horizontal repeatable table, vertical repeatable table, date, multi-select, attachments, containers and nesting of hypertext markup language (HTML) components within tables or containers, etc.

FIG. 11 shows example pseudocode 1100 for updating a component schema in an illustrative embodiment of the invention. In one or more embodiments of the invention, each component is represented as a JSON structure and is dynamically updateable from within the user interface. The component schema can be updated (such as depicted by pseudocode 1100) in real-time as and when its metadata information changes using UI controls (such as depicted in FIG. 4). Such an embodiment can additionally include implementing an observer design pattern that senses for any updates to the schema structure by change of metadata information or by addition of new components on the presentation screen. The layout of the designed presentation layer is represented as a JSON structure.

Figure 12:
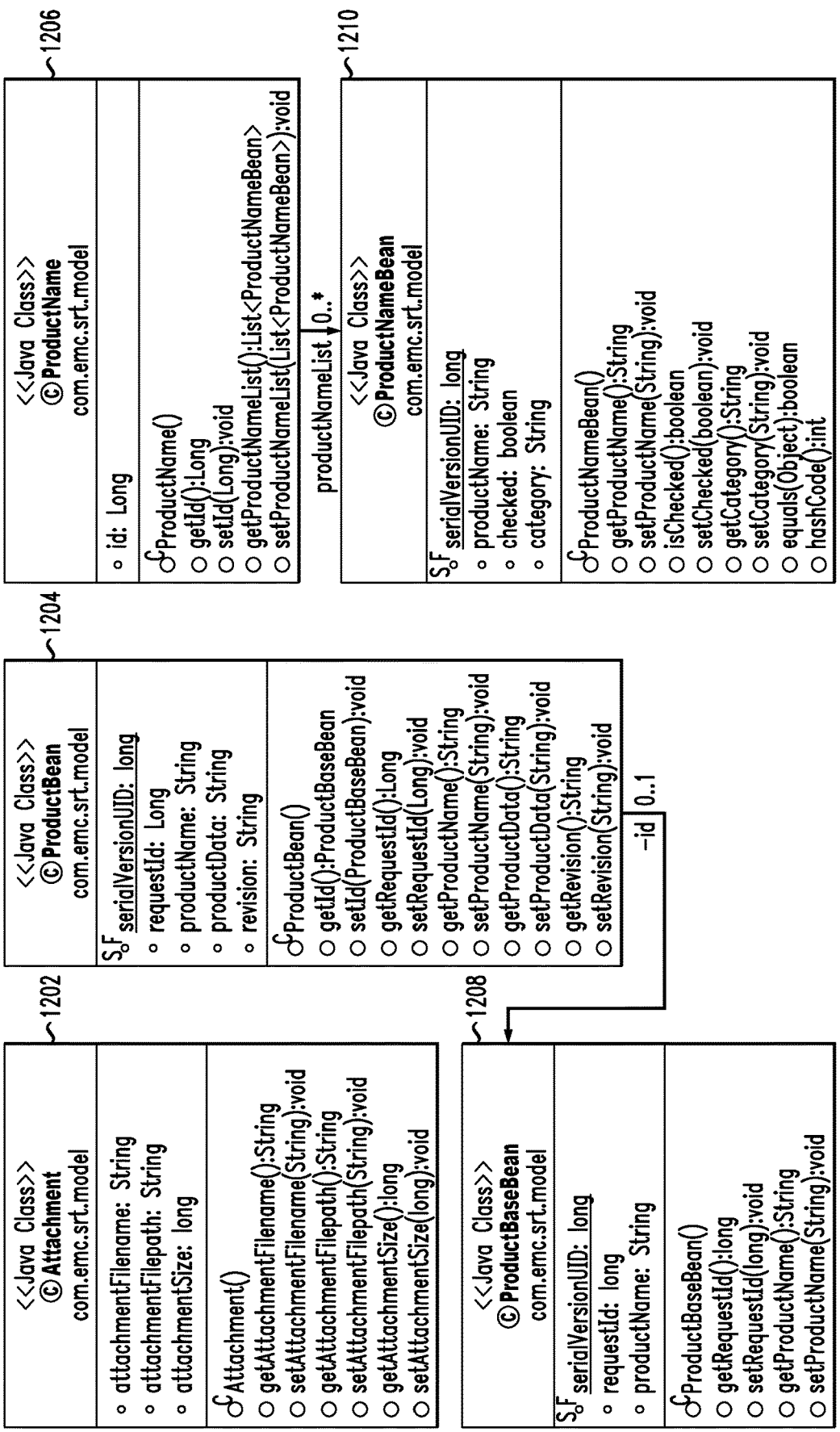
FIG. 12 shows the design of a client product micro-service in an illustrative embodiment of the invention.

FIG. 12 shows the design of a client product microservice in an illustrative embodiment of the invention. In the example depicted in FIG. 12, various Java classes can be utilized in a client product micro-service design architecture. Such Java classes can include, for example, an attachment class 1202, a product class 1204, a first product name class 1206, a product base class 1208, and a second product name class 1210.

More specifically, attachment class 1202 represents a Java class for storing attachment meta information, and product class 1204 represents a Java class for storing the presentation layer structure and revision details utilized to build the presentation layer. Additionally, product name class 1206 represents a Java class for storing the product name and ID details, product base class 1208 represents a Java class for storing the associated product name with the designed presentation layer data, and product name class 1210 represents a Java class for storing the locking category and name information of the designed products.

FIG. 13 shows example controller and repository class diagrams for consumption of form data (in a target application) in an illustrative embodiment of the invention. In the example depicted in FIG. 13, various Java classes and Java interfaces can be utilized in the task of consuming form data in a target application. Such Java classes can include, for example, a product server name class 1302 and a client product controller class 1304. Such Java interfaces can include, for example, a product repository interface 1306 and a product name repository interface 1308.

More specifically, product server name class 1302 represents a Java class for storing the product revision and category details for designed products, and client product controller class 1304 represents a controller class implemented using Spring boot technology providing REST end points to service the integrated enterprise application by using the presentation layer's published data and interfacing with the integrated application. Additionally, product repository interface 1306 represents an interface to establish contact for implementing the published presentation layer designs, enabling searching based on a specific revision or ID, and product name repository interface 1308 represents an interface to establish contact for implementing the published names of the presentation layer designs.

As detailed herein, one or more embodiments of the invention can include designing form data and/or product portfolio information using one or more product designers, and integrating with applications which may require frequent and dynamic content changes. Such an embodiment can additionally include publishing such changes in real-time to production applications, as well as generating one or more types of reports (such as user actions, content change documentations, etc.) and exporting data in a desired format (such as via spreadsheet, PDF, etc.).

Additionally, at least one embodiment of the invention includes UI versioning. Accordingly, in such an embodiment, the presentation layer designer can revert to an older and/or previous version of the published design, as each revision of the published presentation layer design is stored in a NoSQL database collection. Any updates to the new version of the presentation layer can include broadcasting the changes to the application's users of the underlying integrated enterprise application, querying each user as to whether the user wishes to obtain the latest updates or continue to work on the older design(s). Further, one or more embodiments of the invention include default value population in integrated enterprise applications, as well as preserving existing values entered by a user in the target (integrated) application. Such an embodiment can also include prompting or querying a user to take the latest UI updates, thus providing the user flexibility to work with one or more UI versions.

As detailed herein, at least one embodiment of the invention includes implementing an engine to transform a JSON schema to a presentation layer, while preserving existing business logics and validations. Such an embodiment can include enabling options to show or hide a conditional logic implementation for designed components. Additionally, one or more embodiments of the invention include implementing customizable network-attached storage for components (such as attachments components).

Further, as also described herein, at least one embodiment of the invention includes implementing a test-driven design (TDD) mechanism wherein users can view the user interface design and test the designed user interface in real-time before publishing the designed user interface to the (target) enterprise application. Also, in connection with publishing a designed user interface, one or more embodiments of the invention include designing and publishing user interfaces that are device-agnostic with respect to viewing the published user interface (and components thereof).

FIG. 14 is a flow diagram of a process for application development via presentation layer management in an illustrative embodiment. It is to be understood that this particular process is only an example, and additional or alternative processes can be carried out in other embodiments.

In this embodiment, the process includes steps 1400 through 1406. These steps are assumed to be performed by the processor 120 utilizing its modules 130, 132, 134 and 136.

Step 1400 includes representing multiple user interface components related to an application in a pre-determined format, wherein the pre-determined format uses text to represent data objects. In at least one embodiment of the invention, the pre-determined format includes a JSON format. Also, the multiple user interface components can include one or more text fields, one or more input boxes, one or more tables, and/or one or more hypertext markup language components.

Step 1402 includes creating a first version of the application by embedding, in response to one or more user inputs, one or more of the multiple user interface components into a design space of a presentation layer of an enterprise services framework. The one or more user inputs can include, for example, drag-and-drop actions executed by the user. Also, embedding the one or more of the multiple user interface components into the design space can include embedding a modified version of one or more of the multiple user interface components in an existing version of the application, and/or embedding one or more of the multiple user interface components not present in an existing version of the application.

In at least one embodiment of the invention, creating the first version of the application can include modifying one or more of the embedded user interface components, wherein modifying one or more of the embedded user interface components can include changing label information of one or more of the embedded user interface components, highlighting information pertaining to one or more of the embedded user interface components using one or more colors, and/or adding one or more rules to one or more of the embedded user interface components.

Step 1404 includes updating, in accordance with the embedding of the one or more user interface components into the design space, a schema associated with the multiple user interface components represented in the pre-determined format.

Step 1406 includes dynamically outputting one or more subsequent versions of the application based at least in part on the updated schema. In at least one embodiment of the invention, the first version of the application and the one or more subsequent versions of the application are the same (for example, in an embodiment wherein a new application is being created). Also, outputting the one or more subsequent versions of the application can include outputting the one or more subsequent versions of the application in real-time with automatic data combination in connection with the first version of the application. Further, outputting the one or more subsequent versions of the application can include outputting a preview of the one or more subsequent versions of the application to the user for user feedback and/or testing the one or more subsequent versions of the application.

Accordingly, the particular processing operations and other network functionality described in conjunction with the flow diagram of FIG. 14 are presented by way of illustrative example only, and should not be construed as limiting the scope of the invention in any way. Alternative embodiments can use other types of processing operations to detect session-based access anomalies and undertake appropriate remediation actions. For example, the ordering of the process steps may be varied in other embodiments, or certain steps may be performed concurrently with one another rather than serially. Also, as indicated previously, the process steps or subsets thereof may be repeated periodically in conjunction with respective distinct instances of session-based anomaly detection for different user identifiers.

The above-described illustrative embodiments provide significant advantages relative to conventional approaches. For example, some embodiments are configured to translate a JSON schema into a presentation layer while automatically preserving existing business logics and validations. These and other embodiments can effectively implement real-time data-driven user interface updates with limited waiting-time and limited down-time deployment via the use of an elastic schema design.

It is to be appreciated that the particular advantages described above and elsewhere herein are associated with particular illustrative embodiments and need not be present in other embodiments. Also, the particular types of information processing system features and functionality as illustrated in the drawings and described above are exemplary only, and numerous other arrangements may be used in other embodiments.

As mentioned previously, at least portions of the information processing system 100 may be implemented using one or more processing platforms. A given such processing platform comprises at least one processing device comprising a processor coupled to a memory. The processor and memory in some embodiments comprise respective processor and memory elements of a virtual machine or container provided using one or more underlying physical machines. The term "processing device" as used herein is intended to be broadly construed so as to encompass a wide variety of different arrangements of physical processors, memories and other device components as well as virtual instances of such components. For example, a "processing device" in some embodiments can comprise or be executed across one or more virtual processors. Processing devices can therefore be physical or virtual and can be executed across one or more physical or virtual processors. It should also be noted that a given virtual device can be mapped to a portion of a physical one.

Some illustrative embodiments of a processing platform that may be used to implement at least a portion of an information processing system comprises cloud infrastructure including virtual machines (VMs) implemented using a hypervisor that runs on physical infrastructure. The cloud infrastructure further comprises sets of applications running on respective ones of the virtual machines under the control of the hypervisor. It is also possible to use multiple hypervisors each providing a set of virtual machines using at least one underlying physical machine. Different sets of virtual machines provided by one or more hypervisors may be utilized in configuring multiple instances of various components of the system.

These and other types of cloud infrastructure can be used to provide what is also referred to herein as a multi-tenant environment. One or more system components, or portions thereof, are illustratively implemented for use by tenants of such a multi-tenant environment.

As mentioned previously, cloud infrastructure as disclosed herein can include cloud-based systems such as Pivotal Cloud Foundry (PCF), IBM Cloud (Bluemix), Amazon Web Services (AWS), Google Cloud Platform (GCP) and Microsoft Azure. Virtual machines provided in such systems can be used to implement at least portions of one or more of a computer system and a content addressable storage system in illustrative embodiments. These and other cloud-based systems in illustrative embodiments can include object stores such as Amazon S3, GCP Cloud Storage, and Microsoft Azure Blob Storage.

In some embodiments, the cloud infrastructure additionally or alternatively comprises a plurality of containers implemented using container host devices. For example, as detailed herein, a given container of cloud infrastructure illustratively comprises a Docker container or other type of LinuX Containers (LXC). The containers may run on virtual machines in a multi-tenant environment, although other arrangements are possible. The containers may be utilized to implement a variety of different types of functionality within the system 100. For example, containers can be used to implement respective processing devices providing compute and/or storage services of a cloud-based system. Again, containers may be used in combination with other virtualization infrastructure such as virtual machines implemented using a hypervisor.

Illustrative embodiments of processing platforms will now be described in greater detail with reference to FIGS. 15 and 16. Although described in the context of system 100, these platforms may also be used to implement at least portions of other information processing systems in other embodiments.

FIG. 15 shows an example processing platform comprising cloud infrastructure 1500. The cloud infrastructure 1500 comprises a combination of physical and virtual processing resources that may be utilized to implement at least a portion of the information processing system 100. The cloud infrastructure 1500 comprises VMs 1502-1, 1502-2, . . . 1502-L implemented using a hypervisor 1504. The hypervisor 1504 runs on physical infrastructure 1505. The cloud infrastructure 1500 further comprises sets of applications 1510-1, 1510-2, . . . 1510-L running on respective ones of the virtual machines 1502-1, 1502-2, . . . 1502-L under the control of the hypervisor 1504.

Although a single hypervisor 1504 is shown in the embodiment of FIG. 15, system 100 may include multiple hypervisors each providing a set of VMs using at least one underlying physical machine. Different sets of virtual machines provided by one or more hypervisors may be utilized in configuring multiple instances of various components of system 100.

An example of a commercially available hypervisor platform that may be used to implement hypervisor 1504 and possibly other portions of information processing system 100 in one or more embodiments is the VMware® vSphere® which may have an associated virtual infrastructure management system such as the VMware® vCenter™. The underlying physical machines may comprise one or more distributed processing platforms that include one or more storage systems.

As is apparent from the above, one or more of the processing modules or other components of system 100 may each run on a computer, server, storage device or other processing platform element. A given such element may be viewed as an example of what is more generally referred to herein as a "processing device." The cloud infrastructure 1500 shown in FIG. 15 may represent at least a portion of one processing platform. Another example of such a processing platform is processing platform 1600 shown in FIG. 16.

The processing platform 1600 in this embodiment comprises a portion of system 100 and includes a plurality of processing devices, denoted 1602-1, 1602-2, 1602-3, . . . 1602-K, which communicate with one another over a network 1604.

The network 1604 may comprise any type of network, including by way of example a global computer network such as the Internet, a WAN, a LAN, a satellite network, a telephone or cable network, a cellular network, a wireless network such as a Wi-Fi or WiMAX network, or various portions or combinations of these and other types of networks.

The processing device 1602-1 in the processing platform 1600 comprises a processor 1610 coupled to a memory 1612. The processor 1610 may comprise a microprocessor, a microcontroller, an application-specific integrated circuit (ASIC), a field-programmable gate array (FPGA) or other type of processing circuitry, as well as portions or combinations of such circuitry elements.

The memory 1612 may comprise random access memory (RAM), read-only memory (ROM) or other types of memory, in any combination. The memory 1612 and other memories disclosed herein should be viewed as illustrative examples of what are more generally referred to as "processor-readable storage media" storing executable program code of one or more software programs.

Articles of manufacture comprising such processor-readable storage media are considered illustrative embodiments. A given such article of manufacture may comprise, for example, a storage array, a storage disk or an integrated circuit containing RAM, ROM or other electronic memory, or any of a wide variety of other types of computer program products. The term "article of manufacture" as used herein should be understood to exclude transitory, propagating signals. Numerous other types of computer program products comprising processor-readable storage media can be used.

Also included in the processing device 1602-1 is network interface circuitry 1614, which is used to interface the processing device with the network 1604 and other system components, and may comprise conventional transceivers.

The other processing devices 1602 of the processing platform 1600 are assumed to be configured in a manner similar to that shown for processing device 1602-1 in the figure.

Again, the particular processing platform 1600 shown in the figure is presented by way of example only, and system 100 may include additional or alternative processing platforms, as well as numerous distinct processing platforms in any combination, with each such platform comprising one or more computers, servers, storage devices or other processing devices.

For example, other processing platforms used to implement illustrative embodiments can comprise different types of virtualization infrastructure, in place of or in addition to virtualization infrastructure comprising virtual machines. Such virtualization infrastructure illustratively includes container-based virtualization infrastructure configured to provide Docker containers or other types of LXCs.

As another example, portions of a given processing platform in some embodiments can comprise converged infrastructure such as VxRail™, VxRack™, VxBlock™, or Vblock® converged infrastructure commercially available from VCE, the Virtual Computing Environment Company, now the Converged Platform and Solutions Division of Dell EMC.

It should therefore be understood that in other embodiments different arrangements of additional or alternative elements may be used. At least a subset of these elements may be collectively implemented on a common processing platform, or each such element may be implemented on a separate processing platform.

Also, numerous other arrangements of computers, servers, storage products or devices, or other components are possible in the information processing system 100. Such components can communicate with other elements of the information processing system 100 over any type of network or other communication media.

For example, particular types of storage products that can be used in implementing a given storage system of a distributed processing system in an illustrative embodiment include VNX® and Symmetrix VMAX® storage arrays, software-defined storage products such as ScaleIO™ and ViPR®, all-flash and hybrid flash storage arrays such as Unity™, cloud storage products such as Elastic Cloud Storage (ECS), object-based storage products such as Atmos®, scale-out all-flash storage arrays such as XtremIO™, and scale-out NAS clusters comprising Isilon® platform nodes and associated accelerators, all from Dell EMC. Combinations of multiple ones of these and other storage products can also be used in implementing a given storage system in an illustrative embodiment.

It should again be emphasized that the above-described embodiments are presented for purposes of illustration only. Many variations and other alternative embodiments may be used. For example, the disclosed techniques are applicable to a wide variety of other types of information processing systems in which it is desirable to provide efficient application development capabilities. Also, the particular configurations of system and device elements and associated processing operations illustratively shown in the drawings can be varied in other embodiments. Thus, for example, the particular types of processing platforms, modules, cloud-based systems and virtual resources deployed in a given embodiment and their respective configurations may be varied. Moreover, the various assumptions made above in the course of describing the illustrative embodiments should also be viewed as exemplary rather than as requirements or limitations of the invention. Numerous other alternative embodiments within the scope of the appended claims will be readily apparent to those skilled in the art.

What is claimed is:

1. A computer-implemented method comprising:
   representing multiple user interface components related to an application in a pre-determined format, wherein the pre-determined format comprises a JavaScript object notation format;
   creating a first version of the application by embedding, in response to one or more user inputs, one or more of the multiple user interface components into a design space of a presentation layer of an enterprise services framework, wherein embedding comprises translating, via implementation of at least one engine, the JavaScript object notation format into the presentation layer, and wherein translating the JavaScript object notation format into the presentation layer further comprises displaying at least one conditional logic implementation for at least one of the multiple user interface components;
   updating, in accordance with the embedding of the one or more user interface components into the design space, a schema associated with the multiple user interface components represented in the pre-determined format;
   dynamically outputting multiple subsequent versions of the application based at least in part on the updated schema;
   storing at least a first of the multiple subsequent versions in a first NoSQL database designated for non-approved versions of the application, wherein the at least a first version comprises a design that has not been approved for use by at least one application-related entity; and
   storing at least a second of the multiple subsequent versions in a second NoSQL database designated for approved versions of the application, wherein the at least a second version comprises a design that has been approved for use by the at least one application-related entity;
   wherein the method is performed by at least one processing device comprising a processor coupled to a memory.

2. The computer-implemented method of claim 1, wherein the multiple user interface components comprise at least one of one or more text fields, one or more input boxes, one or more tables, and one or more hypertext markup language components.

3. The computer-implemented method of claim 1, wherein the one or more user inputs comprise drag-and-drop actions executed by the user.

4. The computer-implemented method of claim 1, wherein embedding the one or more of the multiple user interface components into the design space comprises embedding a modified version of one or more of the multiple user interface components in an existing version of the application.

5. The computer-implemented method of claim 1, wherein embedding the one or more of the multiple user interface components into the design space comprises embedding one or more of the multiple user interface components not present in an existing version of the application.

6. The computer-implemented method of claim 1, wherein creating the first version of the application comprises modifying one or more of the embedded user interface components.

7. The computer-implemented method of claim 6, wherein modifying one or more of the embedded user interface components comprises changing label information of one or more of the embedded user interface components.

8. The computer-implemented method of claim 6, wherein modifying one or more of the embedded user interface components comprises highlighting information pertaining to one or more of the embedded user interface components using one or more colors.

9. The computer-implemented method of claim 6, wherein modifying one or more of the embedded user interface components comprises adding one or more rules to one or more of the embedded user interface components.

10. The computer-implemented method of claim 1, wherein updating the schema comprises updating the schema in real-time with the embedding of the one or more user interface components into the design space.

11. The computer-implemented method of claim 1, wherein dynamically outputting the multiple subsequent versions of the application comprises outputting a preview of at least one of the multiple subsequent versions of the application to the user for user feedback.

12. The computer-implemented method of claim 1, wherein dynamically outputting the multiple subsequent versions of the application comprises testing at least one of the multiple subsequent versions of the application.

13. A non-transitory processor-readable storage medium having stored therein program code of one or more software programs, wherein the program code when executed by at least one processing device causes said at least one processing device:
   to represent multiple user interface components related to an application in a pre-determined format, wherein the pre-determined format comprises a JavaScript object notation format;
   to create a first version of the application by embedding, in response to one or more user inputs, one or more of the multiple user interface components into a design space of a presentation layer of an enterprise services framework, wherein embedding comprises translating, via implementation of at least one engine, the JavaScript object notation format into the presentation layer, and wherein translating the JavaScript object notation format into the presentation layer further comprises displaying at least one conditional logic implementation for at least one of the multiple user interface components;
   to update, in accordance with the embedding of the one or more user interface components into the design space, a schema associated with the multiple user interface components represented in the pre-determined format;
   to dynamically output multiple subsequent versions of the application based at least in part on the updated schema;
   to store at least a first of the multiple subsequent versions in a first NoSQL database designated for non-approved versions of the application, wherein the at least a first version comprises a design that has not been approved for use by at least one application-related entity; and to store at least a second of the multiple subsequent versions in a second NoSQL database designated for approved versions of the application, wherein the at least a second version comprises a design that has been approved for use by the at least one application-related entity.

14. The non-transitory processor-readable storage medium of claim 13, wherein updating the schema comprises updating the schema in real-time with the embedding of the one or more user interface components into the design space.

15. The non-transitory processor-readable storage medium of claim 13, wherein dynamically outputting the multiple subsequent versions of the application comprises outputting a preview of at least one of the multiple subsequent versions of the application to the user for user feedback.

16. The non-transitory processor-readable storage medium of claim 13, wherein dynamically outputting the multiple subsequent versions of the application comprises testing at least one of the multiple subsequent versions of the application.

17. An apparatus comprising:
at least one processing device comprising a processor coupled to a memory;
said at least one processing device being configured:
to represent multiple user interface components related to an application in a pre-determined format, wherein the pre-determined format comprises a JavaScript object notation format;
to create a first version of the application by embedding, in response to one or more user inputs, one or more of the multiple user interface components into a design space of a presentation layer of an enterprise services framework, wherein embedding comprises translating, via implementation of at least one engine, the JavaScript object notation format into the presentation layer, and wherein translating the JavaScript object notation format into the presentation layer further comprises displaying at least one conditional logic implementation for at least one of the multiple user interface components;
to update, in accordance with the embedding of the one or more user interface components into the design space, a schema associated with the multiple user interface components represented in the pre-determined format;
to dynamically output multiple subsequent versions of the application based at least in part on the updated schema;
to store at least a first of the multiple subsequent versions in a first NoSQL database designated for non-approved versions of the application, wherein the at least a first version comprises a design that has not been approved for use by at least one application-related entity; and
to store at least a second of the multiple subsequent versions in a second NoSQL database designated for approved versions of the application, wherein the at least a second version comprises a design that has been approved for use by the at least one application-related entity.

18. The apparatus of claim 17, wherein updating the schema comprises updating the schema in real-time with the embedding of the one or more user interface components into the design space.

19. The apparatus of claim 17, wherein dynamically outputting the multiple subsequent versions of the application comprises outputting a preview of at least one of the multiple subsequent versions of the application to the user for user feedback.

20. The apparatus of claim 17, wherein dynamically outputting the multiple subsequent versions of the application comprises testing at least one of the multiple subsequent versions of the application.

* * * * *